Patented July 5, 1927.

1,635,095

UNITED STATES PATENT OFFICE.

STANLEY I. ROBINSON, OF NAMPA, IDAHO.

PAINT AND PLASTIC SUBSTANCE.

No Drawing.   Application filed April 24, 1924.   Serial No. 708,804.

My invention relates to compositions of matter, to be used as paints, and plastic coatings, sealing compounds, and the like; particularly for exposure to the weather.

It is my object to provide a series of compositions of similar nature, and analogous composition, formed on a base of coal tar, and suitable for covering objects which are to be exposed to weathering action, acid atmospheres, acid contacts, and other uses where ordinary paints, coatings and plastics are insufficient.

It is also my object to provide an inexpensive and durable black pigment, which is highly waterproof, and can be mixed with oils, graphite, japan drier and the like, or used directly, as roofing paint, chimney paint, tar putty, auto top dressing and the like.

I accomplish my object by that certain composition of matter, formed as follows:—

The ingredients used by me are unslacked lime, water and coal or gas tar, all of which are commercial products and by the use of the terms above I do not wish to exclude commercial substitutes for the products named, such as dehydrated lime, or any of the calcium salts, instead of unslacked lime, candle tar or pine tar, instead of coal tar, and like equivalents for the products named.

I take unslacked lime and mix it to obtain a lime water retaining a desired proportion of finely divided slacked lime in suspension. In the thinner mixtures of milk-like consistency, I term them milk of lime, and in thicker mixtures which are smooth and slightly viscous, I term them cream of lime. All heavy particles of lime should be strained off from the liquids, the milk of lime retaining in suspension sufficient finely divided lime to be about the consistency of whitewash and the cream of lime retaining two or three times the volume of finely divided lime as the milk of lime.

I bring the tar to a plastic or liquid condition so as to facilitate the chemical action obtained, and in a suitable mixer, I mix desired portions of the lime and water solution with the finely divided lime suspended therein, and the tar, until all reactions that will take place have been completed, and the final products can be obtained.

For roof paint, to be used direct or with oil and graphite, and auto top dressing to be used in mixture with other substances for quick drying, I mix three fourths part by volume of coal or gas tar, and one part by volume of milk of lime, and stir and mix until all the milk of lime is retained in suspension in the tar. The product of this process of paintlike consistency is to be used direct as a roof paint, or can be mixed with other dark pigments and oil, for uses of the same character.

Another formula which is less viscous, is made by thoroughly incorporating by a mixing operation, two fifths part by volume of milk of lime and three fifths part by volume of coal or gas tar.

Where the lime is used as a cream and less of the tar in proportion a coagulation and precipitation take place. In such cases the precipitate, or heavier liquid is used, and the thin liquor arising to the surface, can be separated from the coagulated matter, and will make a splendid lice killer for use on plants, or in chicken and poultry houses for lice and mites.

Thus for a plastic cement I take two parts by volume of coal or gas tar, and two parts by volume or a little more of cream of lime, and stir and mix until thorough suspension of one mixture in the other has taken place. The clear liquid arising to the top, is drawn off, and the coagulated precipitate forms a weatherproof plastic cement.

For putty, I use two fifths parts by volume of coal tar, and three fifths parts by volume of cream of lime. The result of mixing these substances, is that a curdling takes place, and the curdled material is segregated and kneaded up into a tar putty, which is an excellent product for many uses.

The milk and cream of lime should be made by pouring cold water over lumps of lime, and used while the heat of reaction in the water still remains in the composition and stirring to cause a portion of the finely divided lime to remain in suspension.

I will recite in the claims that follow, what I believe to be the essence of my invention. In the above specification I have stated those processes followed by me with success and make no representations as to the nature of the recations or the reasons for the quality of the final products.

Having thus described my invention, What I claim as new and desire to secure by Letters Patent, is:—

That process of making paint, which consists in making lime water, mixing sufficient lime therewith to make a thin cream, then mixing from one-half to three-fourths part, by volume, of liquid tar therewith prior to the loss of all the heat of the chemical reaction of the lime and water, drawing off the upper layers of the mixture, and utilizing the precipitate as a pigment.

STANLEY I. ROBINSON.